(12) United States Patent
Lee et al.

(10) Patent No.: US 8,920,759 B2
(45) Date of Patent: Dec. 30, 2014

(54) METHOD AND APPARATUS FOR REDUCING $NO_x$ EMISSIONS FROM A LEAN BURNING HYDROCARBON FUELED POWER SOURCE

(75) Inventors: Jong H. Lee, Rochester Hills, MI (US); David B. Brown, Brighton, MI (US); Michael J. Paratore, Jr., Howell, MI (US); Yongsheng He, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 404 days.

(21) Appl. No.: 12/395,950

(22) Filed: Mar. 2, 2009

(65) Prior Publication Data

US 2010/0221154 A1    Sep. 2, 2010

(51) Int. Cl.
*B01D 53/34* (2006.01)
*B01D 53/56* (2006.01)
*B01D 53/58* (2006.01)
*B01D 53/86* (2006.01)
*B01D 53/94* (2006.01)
(Continued)

(52) U.S. Cl.
CPC ............. *B01J 23/58* (2013.01); *B01J 37/0228* (2013.01); *B01D 53/945* (2013.01); *B01D 2255/91* (2013.01); *B01D 2255/1021* (2013.01); *B01D 2255/2022* (2013.01); *B01D 2255/1023* (2013.01); *Y02T 10/22* (2013.01)
USPC ............... 423/213.5; 423/213.7; 423/237; 423/238; 423/239.1; 423/239.2; 502/66; 502/74; 502/87; 502/262; 502/327; 502/328; 502/330; 502/332; 502/333; 502/334; 502/339; 502/355; 502/415; 502/439

(58) Field of Classification Search
USPC ......... 502/262, 327, 328, 330, 332–334, 339, 502/355, 415, 439, 66, 74, 87; 423/213.5, 423/213.7, 237, 238, 239.1, 239.2
See application file for complete search history.

(56) References Cited

U.S. PATENT DOCUMENTS 4,727,052 A * 2/1988 Wan et al. ...................... 502/327
4,975,406 A * 12/1990 Frestad et al. ................. 502/302
(Continued)

OTHER PUBLICATIONS

Enderle, C., G. Vent and M. Paule, "BLUETEC Diesel Technology-Clean, Efficient and Powerful", SAE Technical Paper Series, Apr. 2008, p. 1-10, SAE International, Warrendale USA.

(Continued)

*Primary Examiner* — Cam N. Nguyen
(74) *Attorney, Agent, or Firm* — BrooksGroup

(57) ABSTRACT

One embodiment includes an oxidation catalyst assembly formed by applying a washcoat of platinum and a $NO_x$ storage material to a portion of a substrate material.

6 Claims, 1 Drawing Sheet

(51) Int. Cl.

| | | |
|---|---|---|
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *B01J 29/00* | (2006.01) | |
| *B01J 29/04* | (2006.01) | |
| *B01J 29/06* | (2006.01) | |
| *B01J 21/00* | (2006.01) | |
| *B01J 21/04* | (2006.01) | |
| *B01J 23/00* | (2006.01) | |
| *B01J 23/02* | (2006.01) | |
| *B01J 23/08* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 20/00* | (2006.01) | |
| *B01J 37/02* | (2006.01) | |

(56) References Cited

U.S. PATENT DOCUMENTS

| | | | | |
|---|---|---|---|---|
| 5,250,489 | A * | 10/1993 | Dalla Betta et al. | 502/262 |
| 5,597,771 | A * | 1/1997 | Hu et al. | 502/304 |
| 5,891,409 | A * | 4/1999 | Hsiao et al. | 423/239.1 |
| 6,375,910 | B1 * | 4/2002 | Deeba et al. | 423/239.1 |
| 6,677,272 | B2 * | 1/2004 | Beall et al. | 502/439 |
| 6,753,294 | B1 * | 6/2004 | Brisley et al. | 502/439 |
| 6,764,665 | B2 * | 7/2004 | Deeba et al. | 423/239.1 |
| 7,022,646 | B2 * | 4/2006 | Li | 502/339 |
| 7,119,044 | B2 * | 10/2006 | Wei et al. | 502/300 |
| 7,188,469 | B2 * | 3/2007 | Bonadies et al. | 60/286 |
| 7,229,597 | B2 | 6/2007 | Patchett et al. | |
| 7,238,640 | B2 * | 7/2007 | Jen et al. | 502/325 |
| 7,276,212 | B2 * | 10/2007 | Hu et al. | 422/177 |
| 7,329,629 | B2 * | 2/2008 | Gandhi et al. | 502/325 |
| 7,374,729 | B2 * | 5/2008 | Chen et al. | 422/177 |
| 7,375,056 | B2 * | 5/2008 | Wei et al. | 502/439 |
| 7,462,338 | B2 * | 12/2008 | Southward | 423/213.5 |
| 7,485,271 | B2 * | 2/2009 | Golunski et al. | 423/213.2 |
| 7,485,272 | B2 * | 2/2009 | Driscoll et al. | 423/213.2 |
| 7,490,464 | B2 * | 2/2009 | Li et al. | 60/295 |
| 7,550,124 | B2 * | 6/2009 | Chen et al. | 423/213.2 |
| 7,576,031 | B2 * | 8/2009 | Beutel et al. | 502/339 |
| 7,674,743 | B2 * | 3/2010 | Gandhi et al. | 502/302 |
| 7,749,472 | B2 * | 7/2010 | Chen et al. | 423/213.2 |
| 7,758,834 | B2 * | 7/2010 | Chen et al. | 423/213.2 |
| 7,772,147 | B2 * | 8/2010 | Collier et al. | 502/240 |
| 7,861,516 | B2 * | 1/2011 | Allansson et al. | 60/286 |
| 7,870,724 | B2 * | 1/2011 | Ura et al. | 60/299 |
| 7,875,573 | B2 * | 1/2011 | Beutel et al. | 502/339 |
| 7,902,107 | B2 * | 3/2011 | Patchett et al. | 502/74 |
| 7,906,449 | B2 * | 3/2011 | Ando et al. | 502/66 |
| 8,037,674 | B2 * | 10/2011 | Kupe et al. | 60/286 |
| 8,480,986 | B2 * | 7/2013 | Andreasson et al. | 423/239.1 |
| 8,580,216 | B2 * | 11/2013 | Malyala et al. | 423/239.1 |
| 2002/0081255 | A1 * | 6/2002 | Cutler et al. | 423/213.5 |
| 2003/0021745 | A1 * | 1/2003 | Chen | 423/239.1 |
| 2003/0086851 | A1 * | 5/2003 | Dou | 423/239.1 |
| 2003/0114300 | A1 * | 6/2003 | Twigg | 502/527.18 |
| 2003/0175192 | A1 * | 9/2003 | Hu et al. | 423/239.1 |
| 2004/0077494 | A1 * | 4/2004 | LaBarge et al. | 502/303 |
| 2004/0115111 | A1 * | 6/2004 | Twigg | 423/239.1 |
| 2004/0198595 | A1 * | 10/2004 | Chen | 502/328 |
| 2004/0254073 | A1 * | 12/2004 | Wei et al. | 502/527.12 |
| 2005/0138916 | A1 * | 6/2005 | Bonadies et al. | 60/275 |
| 2006/0039843 | A1 * | 2/2006 | Patchett et al. | 423/239.1 |
| 2006/0254258 | A1 * | 11/2006 | Blakeman et al. | 60/286 |
| 2007/0122317 | A1 * | 5/2007 | Driscoll et al. | 422/170 |
| 2007/0137184 | A1 * | 6/2007 | Patchett et al. | 60/286 |
| 2008/0127638 | A1 * | 6/2008 | Vaarkamp et al. | 60/297 |
| 2008/0132405 | A1 * | 6/2008 | Patchett et al. | 502/74 |
| 2008/0141661 | A1 * | 6/2008 | Voss et al. | 60/295 |
| 2008/0241032 | A1 * | 10/2008 | Zuberi | 423/235 |
| 2008/0256936 | A1 * | 10/2008 | Zuberi | 60/299 |
| 2009/0104096 | A1 * | 4/2009 | Patchett et al. | 423/213.5 |
| 2009/0173063 | A1 * | 7/2009 | Boorse et al. | 60/299 |

OTHER PUBLICATIONS

Lee, Jong, Micheal Paratore, David Brown, "Evaluation of Cu-bassed SCR/DPF technology for diesel exhaust emission control", 2007 SAE International.

Bremm, Pfeifer, Leyrer, Mueller, Kruze, Paule, Keppeler, Vent, "Bluetec Emission Control System forthe US Tier2 Bin5 Legislation", SAE Technical Paper Series, Apr. 2008, SAE.

Mattes, Wolfgang, "BMW Diesel", BMW Groups DEER 2007, Aug. 13-16, 2007, p. 1-29, 13th DEER Conference, Detroit.

Dorenkamp, "LNT or Urea SCR Technology: Which is the right technology for TIER 2 BIN 5 passenger vehicles?", Volkswagen AG, Wolfsburg, Aug. 2006, p. 1-31, 12th DEER Conference.

Lee, U.S. Appl. No. 12/255,069, filed Oct. 21, 2008, Method Architecture for Reducing Nox and Particulate Matter Emissions in Exhaust Gas from Hydrocarbon Fuel Source with Fuel Lean Combustion Mix.

* cited by examiner

METHOD AND APPARATUS FOR REDUCING $NO_x$ EMISSIONS FROM A LEAN BURNING HYDROCARBON FUELED POWER SOURCE

TECHNICAL FIELD

The technical field generally relates to treatment of exhaust gas from a hydrocarbon fueled power source, such as a diesel engine, operated with a fuel lean combustion mixture. More specifically, the disclosure sets forth a method and apparatus for reducing $NO_x$ emissions from a lean burning hydrocarbon fueled power source.

BACKGROUND

Diesel engines, some gasoline fueled engines and many hydrocarbon fueled power plants, are operated at higher than stoichiometric air to fuel mass ratios for improved fuel economy. Such lean-burning engines and other power sources, however, produce a hot exhaust with a relatively high content of oxygen and nitrogen oxides ($NO_x$).

In the case of diesel engines, the temperature of the exhaust from a warmed up engine is typically in the range of 200 degrees to 400 degrees Celsius, and has a typical composition, by volume, of about 17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

SUMMARY OF EXEMPLARY EMBODIMENTS OF THE INVENTION

In one exemplary embodiment, an oxidation catalyst assembly may be formed by applying a washcoat of platinum and a $NO_x$ storage material to a portion of a substrate material.

An exemplary method for forming a dual zone oxidation catalyst assembly may be achieved by applying a washcoat comprising platinum or palladium or a mixture of platinum and palladium to a first portion of a substrate material and applying a second washcoat of platinum and a $NO_x$ storage material to a second portion of the substrate material.

An exemplary $NO_x$ reduction system includes a catalytic reduction reactor, a particulate filter, and a catalytic oxidation reactor that includes an oxidation catalyst assembly in which a portion of a substrate material includes an active catalyst material and a $NO_x$ storage material.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
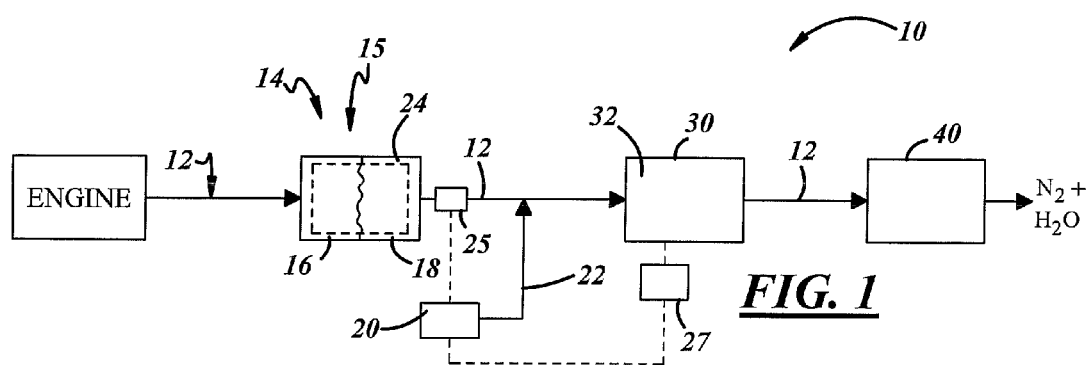
FIG. 1 is a schematic flow diagram of an exhaust system for a lean burning hydrocarbon fueled plant according to an exemplary embodiment.

A flow diagram of an exhaust system 10 for a hydrocarbon burning engine is illustrated according to one exemplary embodiment in FIG. 1. An exhaust stream 12 from the exhaust manifold of an engine operating at an air-to-fuel mass ratio well above the stoichiometric ratio is to be treated to reduce the $NO_x$ (mainly a mixture of NO and $NO_2$ with some $N_2O$) content to nitrogen ($N_2$) and water ($H_2O$). When the exhaust stream 12 is from a gasoline-fueled engine operated, for example, at an air to fuel ratio of greater than 17 (i.e. A/F>17), the exhaust gas contains some unburned hydrocarbons (HC), $NO_x$, carbon monoxide (CO), carbon dioxide ($CO_2$), water ($H_2O$) and nitrogen ($N_2$). The exhaust stream 12 from a diesel engine contains the same gaseous constituents plus suspended diesel particulates (composed of high molecular weight hydrocarbons deposited on carbon particles).

Such hydrocarbon containing exhaust streams 12 may first be passed through a catalytic oxidation reactor 14, which substantially completes the oxidation of carbon monoxide to carbon dioxide and the oxidation of hydrocarbons to carbon dioxide and water. There is typically abundant oxygen in the exhaust gas stream 12 for these reactions.

In the exemplary embodiment, the catalytic oxidation reactor 14 may be a catalytic oxidation reactor 14 having an oxidation catalyst assembly. In another exemplary embodiment shown schematically in FIGS. 1 and 2, the oxidation catalyst assembly is a dual zone type oxidation catalyst assembly 15.

Figure 2:
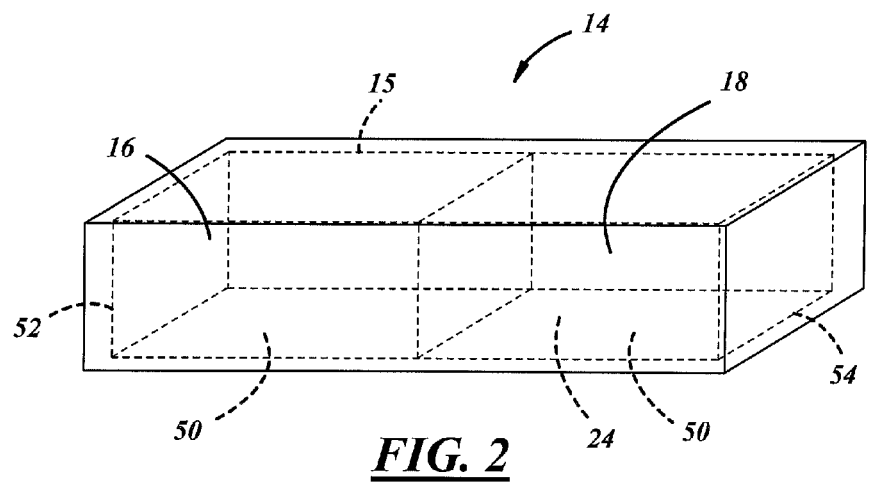
FIG. 2 is a schematic perspective view of the catalytic oxidation reactor in accordance with an exemplary embodiment.

As shown best schematically in FIG. 2, the oxidation catalyst assembly 15 may include a traditional ceramic substrate material 50 such as cordierite. A first washcoat 52 may be applied to the front side 16 of the substrate material 50 (at about 5~150 g/ft$^3$) and may include platinum, palladium, and other support materials. In one exemplary group of embodiments, the ratio of platinum to palladium in the first washcoat 52 may vary between about 100 percent platinum and about 100 percent palladium.

In addition, as also shown in FIG. 2, a second washcoat 54 may be applied onto the rear side 18 of the substrate material 50 (at about 5~150 g/ft$^3$) and may include platinum, palladium, a $NO_x$ storage material 24, and other support materials. In one exemplary group of embodiments, the ratio of platinum to palladium in the second washcoat 54 may vary between about 100 percent platinum to a mixture of about 50 percent palladium and 50 percent platinum.

An alkali group metal (i.e. Group 1A metal on the periodic table of elements) oxide or alkaline earth group metal (i.e. Group IIA metal on the periodic table of elements) oxide, or a mixture of alkali group metal oxides and alkaline earth group metal oxides, may be added as the $NO_x$ storage material 24 to the formulation of the washcoat 54 applied to the rear side 18 of the substrate material 50.

In one exemplary formulation, the alkaline earth group metal may be barium oxide that may be added as the $NO_x$ storage material 24 to the formulation of the washcoat 54 applied to the rear side 18 of the substrate material 50. Alternatively, in another exemplary formulation, the alkali group metal oxide may be potassium oxide that may be added as the $NO_x$ storage material 24 to the formulation of the washcoat 54 applied onto the rear side 18 of the substrate material 50. In still another exemplary formulation, a mixture of barium oxide and the potassium oxide may be added to the formulation of the washcoat 54.

In an exemplary method for forming the second washcoat 54, a slurry may be prepared by mixing alumina, an active catalyst material in the form of one or more precious metal group precursors (including platinum and/or palladium precursors), the $NO_x$ storage material 24 (alkali metal oxide precursors and/or alkaline earth metal oxide precursors) binder materials and water or other solvents. A precursor may include the elements or compounds in their original forms, and well as any salts thereof. For example, a platinum precursor may include elemental platinum as well as platinum nitrate or platinum chloride. The alumina may be utilized to provide a large surface area for the precious metal group precursors, and also may act as a binder, especially in bohemite form.

The slurry is then applied to the rear portion 18 of the substrate 50 in any one of a number of conventional ways such as dipping, waterfall, and vacuum suction to a desired loading. The loading is determined by weighing the substrate 50 both before and after application of the slurry. This weight thus determines the calculated weight percentage of each component of the slurry applied to the substrate 50. The coated substrate is dried and calcined at an elevated temperature.

In an alternative exemplary method, the precious metal group precursors and alkali metal (or alkaline earth metal) oxide precursors can be formed in separate slurries and applied stepwise to the substrate 50.

In still another exemplary method, the precious metal group precursors can be applied to alumina, which is then dried and calcined. The dried and calcined material is then added to a slurry containing the alkali metal oxide (or alkaline earth metal oxide) precursors and binder materials and applied to the substrate 50 and dried.

Referring back to the exhaust system 10 of FIG. 1, the exhaust stream 12 thus first passes through a platinum- and/or palladium-containing front side 16 of the assembly 15, which oxidizes hydrocarbons and carbon monoxide to carbon dioxide, and subsequently passes through a platinum-rich rear side 18 of the assembly 15, which oxidizes NO to $NO_2$. In addition, the $NO_x$ storage material 24 on the rear side 18 may store $NO_2$ during the cold start period (i.e. the period of time before the $NO_x$ reduction components of the system 10 may be functioning substantially near their maximum capabilities).

The exhaust stream 12 may then enters a catalytic reduction reactor 30 that primarily functions to substantially reduce NO, $N_2O$ and $NO_2$ (i.e. $NO_x$) to $N_2$ and water. The catalytic reduction reactor 30 may include a selective catalytic reduction (SCR) catalyst 32.

Finally, the exhaust stream 12 containing $N_2$ and water enters a particulate filter 40, which may remove any remaining particulate matter prior to the exhaust stream 12 being emitted to the atmosphere. In alternative exemplary embodiments, the particulate filter 40 may be coupled in the exhaust stream 12 at a location upstream of the catalytic reduction reactor 30 and still function is substantially the same manner. Moreover, in further exemplary embodiments, the catalytic reduction reactor having an SCR catalyst and particulate filter may be combined into a single unit, otherwise known as a 2-way catalytic reduction reactor/particulate filter (2-way SCR/PF), and still fall within the spirit of the present invention. One exemplary SCR/PF that may be utilized is described in U.S. patent application Ser. No. 12/255,069, filed Oct. 21, 2008, and herein incorporated by reference.

Ammonia ($NH_3$) or urea may also be added to exhaust stream 12 after it exits the catalytic oxidation reactor 14. Ammonia can be stored in a suitable form (such as liquid ammonia or as urea) on-board a lean burn engine vehicle, or near-by a stationary engine, collectively referred to herein as an ammonia injector device 20, and added as stream 22 to the exhaust stream 12. The ammonia or urea participate in the reduction of NO and $NO_2$ to $N_2$. For systems including an SCR catalyst 32, as shown in FIG. 1, the ammonia stream 22 may be introduced upstream of the catalytic reduction reactor 30 and the particulate filter 40.

When utilized, the SCR catalyst 32 may be formed from a washcoat including a base metal as the active material contained in a zeolite material and other support materials coupled to a conventional substrate material such as cordierite. The base metal aids in converting NO to $NO_2$ and subsequently converting $NO_2$ to $N_2$ and water which is discharged through the tailpipe (not shown) as an emission.

Examples of base metals that may be used in the exemplary embodiments include but are not limited to copper and iron coupled within a zeolite structure. One exemplary SCR catalyst includes Cu/ZSM-5 catalyst particles containing about 2.5 weight percent of copper.

Maximum reduction performance of the exhaust system 10 including a SCR catalyst 32 is often achieved at a substantially equimolar ratio (1:1 ratio) of NO and $NO_2$ in the exhaust stream 12, especially at lower temperatures (such as start up or warm up conditions for the engine) where the SCR catalyst 32 does not convert $NO_x$ to $N_2$ at its maximum efficiency. In addition, at the 1:1 ratio, the detrimental effects of high space velocity and SCR catalyst 32 aging can be minimized.

In another alternative embodiment, a $NO_x$ sensor 25 may coupled to the ammonia injector device 20 an introduced within the exhaust stream 12 downstream of the catalytic oxidation reactor 14 that directs the introduction and amount of the ammonia stream 22 from the injector device 20. The ammonia injector device 20 therefore only directs the introduction of ammonia or urea to the exhaust stream in sufficient quantities to achieve a desired ratio of ammonia to NOx based on the $NO_x$ sensor 25 readings. While the $NO_x$ sensor 25 in FIG. 1 is illustrated as being located upstream of the catalytic reduction reactor 30, in other alternative exemplary embodiments, it may be located downstream of the catalytic reduction reactor 30 and particulate filter 40.

In yet another alternative exemplary embodiment, a temperature sensor 27 may be coupled to the SCR catalyst 32 and to the ammonia injector device 20. The ammonia injector device 20 therefore only directs the introduction of ammonia or urea to the exhaust stream 12 when the temperature sensor 27 indicates that the temperature of the SCR catalyst 32 is above a predetermined temperature threshold. This temperature threshold is a temperature below which the SCR catalyst 32 may not be working at its maximum efficiency to substantially reduce NO, $N_2O$ and $NO_2$ (i.e. $NO_x$) to $N_2$ and water. The SCR catalyst 32 is typically below the threshold temperature during cold start conditions.

In still another exemplary embodiment, both a $NO_x$ sensor 25 and a temperature sensor 27 may be utilized. Therefore, the ammonia injector device 20 will only inject ammonia or urea into the exhaust stream 12 when the temperature of the SCR catalyst 32 is above the predetermined threshold temperature and further in direct 1:1 molar proportion of ammonia to $NO_x$ based on the $NO_x$ sensor 25 readings.

The $NO_x$ storage material 24 may function to store $NO_2$ during the cold start period. The stored $NO_2$ may be removed from the $NO_x$ storage material 24 during normal SCR catalyst operation at normal operating temperatures, and may otherwise be removed during periodic filter regeneration. As a result, the exhaust system 10 may offer improved $NO_x$ reduction performance at reduced fuel consumption and hydrocarbon emissions during the cold start period.

The above description of embodiments of the invention is merely exemplary in nature and, thus, variations thereof are not to be regarded as a departure from the spirit and scope of the invention.

What is claimed is:

1. A method comprising:
    providing an exhaust stream from a gasoline-fueled or diesel engine operated at an air to fuel ratio of greater than 17;
    forming an oxidation catalyst assembly comprising:
       (a) providing a substrate material;
       (b) applying a first washcoat to a first portion of said substrate material; said first washcoat including a catalyst consisting essentially of platinum, palladium or a mixture of platinum and palladium; and
       (c) applying a second washcoat to a second portion of said substrate material, said second washcoat comprising platinum and a $NO_x$ storage material;
    providing an ammonia injector device;
    providing a selective catalytic reduction catalyst, the selective catalytic reduction catalyst comprising at least one of copper or iron coupled to a zeolite structure; and
    passing said exhaust stream through said oxidation catalyst assembly, directing said injector device to add ammonia or urea to the exhaust stream exited from the oxidation catalyst assembly and further passing said exhaust stream through said selective catalytic reduction catalyst.

2. The method of claim 1, wherein applying a second washcoat comprises:
    preparing a slurry including an active catalyst material comprising a mixture of platinum and palladium at a ratio between 100% Platinum and 50% Platinum and 50% Palladium, a $NO_x$ storage material, and a binder material;
    applying said slurry to a loading of about 5-150 $g/ft^3$ on said substrate;
    drying said slurry; and
    calcining said dried slurry.

3. The method of claim 2, wherein said $NO_x$ storage material is in the form of an alkali metal oxide precursor, an alkaline earth metal oxide precursor or a mixture thereof.

4. The method of claim 1, wherein said NOx storage material comprises a mixture of barium oxide and potassium oxide.

5. The method of claim 1 further comprising providing a temperature sensor coupled to the ammonia injector device and the selective catalytic reduction catalyst; and directing the injector device to add ammonia or urea to said exhaust stream only when the temperature of the selective catalytic reduction catalyst is above a threshold temperature predetermined to allow substantial reduction of NOx into $N_2$.

6. The method of claim 5, wherein said threshold temperature is the temperature of the selective catalytic reduction catalyst after the cold start period of the engine has passed.

* * * * *